Patented Apr. 29, 1924.

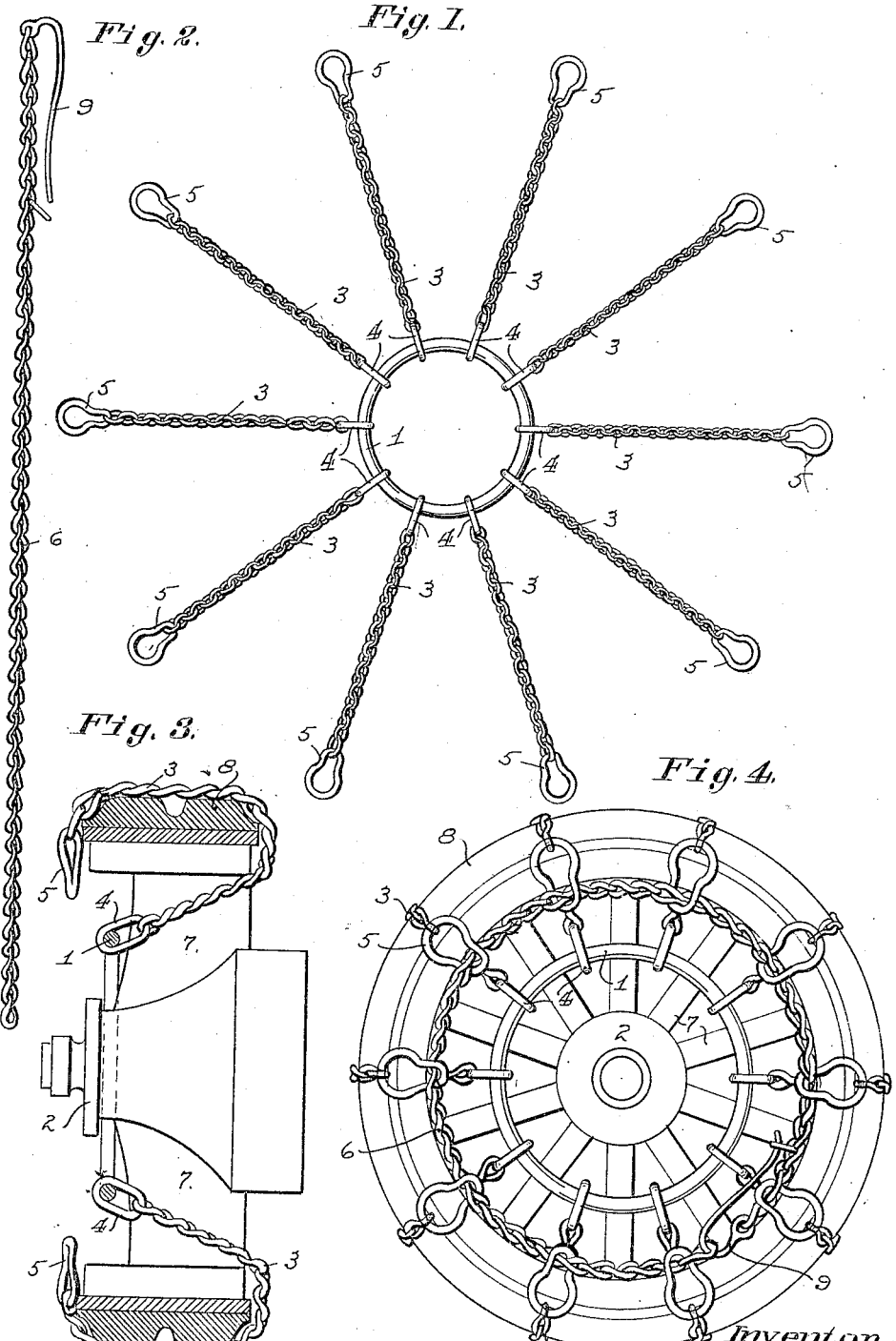

1,492,334

UNITED STATES PATENT OFFICE.

KENNETH LE GAR, OF TAFT, CALIFORNIA.

ANTISKID CHAIN.

Application filed July 16, 1923. Serial No. 651,792.

*To all whom it may concern:*

Be it known that I, KENNETH LE GAR, a citizen of the United States, residing at Taft, in the county of Kern and State of California, have invented certain new and useful Improvements in Antiskid Chains, of which the following is a specification.

My invention relates to anti-skid chains for vehicle wheels. The object of my invention is to provide an anti-skid chain which may be quickly and easily applied from the outside of the wheel and while the wheel is partially buried in mud or sand. A further object is to provide an anti-skid chain, all the cross chains of which may be uniformly tightened by a single operation, and which will be anchored to the wheel to prevent said wheel from turning within the chain and to prevent the chain from being thrown off.

My anti-skid chain is particularly suitable for use upon the wheels of motor trucks, where the space between the wheels and the frame or body is so limited as to make it extremely inconvenient to connect any members of the chain behind the wheels. My chains may be used upon chain driven trucks without danger of interfering with the driving chains.

My invention will now be fully described with reference to the accompanying drawings, wherein:—

Fig. 1 is an elevation of the spider portion of one of my anti-skid chains.

Fig. 2 is an elevation of the tightening chain.

Fig. 3 is a section through a wheel, showing the spider portion of my chain in place, with the tightening chain removed.

Fig. 4 is a side elevation of a wheel with my chain mounted and ready for use.

In the drawings, the reference numeral 1 designates a continuous member, preferably a solid ring, sufficiently large in diameter to freely encircle the outer projecting portion 2 of the wheel hub. A plurality of cross chains 3 are permanently secured to said ring 1 by means of freely fitting links 4, forming the spider portion of the device as shown in Fig. 1. The cross chains 3 are the road engaging members, and are preferably formed of twisted links to prevent undue wear on the tire. Each cross chain 3 has at its free end a connecting link 5, preferably in the form of a harp link as shown; through which may be passed the tightening chain 6 shown in Fig. 2.

In applying the chain to a wheel, the ring 1 is placed about the hub 2, against or in proximity to the spokes 7, and the cross chains 3 are passed through between said spokes and then brought back around the rim and tire 8. The tightening chain 6 is then passed successively through the harp links 5 of the several cross chains 3, and its ends connected together by some suitable means, as for example a toggle link 9, thus tightening all said cross chains simultaneously and uniformly.

The connecting harp links 5 are so formed that the tightening chain 6 can be passed freely through their larger ends, but their smaller ends will engage the links of said tightening chain and prevent them from shifting. Before the tightening chain 6 is passed through said harp links 5, they should be turned from their normally hanging positions shown in Fig. 3 to the positions shown in Fig. 1, that is, with their larger ends outermost with respect to chains 3. Then after said tightening chain has been passed through said larger ends to its proper position, the harp links 5 are reversed to the positions shown in Fig. 4, so that their smaller ends engage the links of said tightening chain to prevent shifting. The ends of the tightening chain 6 are then finally connected together by the toggle link 9.

It will be seen that my chain is effectively anchored by having its cross chains 3 passed between the spokes 7 of the wheel, so that said wheel cannot rotate within the chain, nor can the chain be thrown off and lost upon the breakage of one or more of its cross chains so long as one cross chain remains intact. My chain can be applied, from the outside, without raising the wheel from the ground, even if said wheel is partially embedded in mud or sand. In such cases, as many of the cross chains 3 as possible are placed in position and secured by the tightening chain 6, and then the wheel is turned to enable the remainder of said cross chains to be placed over the tire and similarly secured. Moreover, the cross chains 3 are all kept under uniform tension, their ends being respectively held by the ring 1 and the tightening chain 6, both of which are floating and therefore free to adjust themselves.

I claim:—

1. An anti-skid chain for vehicle wheels comprising a pair of continuous members lying in proximity to one side of the wheel and substantially concentric therewith; and a plurality of cross chains passing around the rim and tire of the wheel, each having one end connected with one of said continuous members and the other end connected with the other continuous member.

2. An anti-skid chain for vehicle wheels comprising a pair of continuous members lying in proximity to one side of the wheel and substantially concentric therewith; and a plurality of cross chains passing around the rim and tire of the wheel, each having one end permanently connected with one of said continuous members and the other end removably connected with the other continuous member.

3. An anti-skid chain for vehicle wheels comprising a continuous member lying in proximity to one side of the wheel and substantially concentric therewith; a plurality of cross chains adapted to pass between the spokes of the wheel and around the tire and having one end of each connected with said continuous member; and a common tightening member adapted for removable connection with the opposite ends of said cross chains.

4. An anti-skid chain for vehicle wheels comprising a continuous member lying in proximity to one side of the wheel and substantially concentric therewith; a plurality of cross chains adapted to pass between the spokes of the wheel and around the tire and having one end of each connected with said continuous member; a common tightening member comprising a single length of chain adapted for removable connection with the opposite ends of said cross chains; and means for connecting the ends of said tightening member together.

5. An anti-skid chain for vehicle wheels comprising a continuous member lying in proximity to one side of the wheel and substantially concentric therewith; a plurality of cross chains adapted to pass between the spokes of the wheel and around the tire and having one end of each connected with said continuous member; a reversible harp link at the end of each cross chain; a common tightening member adapted to pass freely through the larger ends of said harp links and to be engaged by the smaller ends thereof; and means for connecting the ends of said tightening member together.

6. An anti-skid chain for vehicle wheels comprising a continuous member lying in proximity to one side of the wheel and substantially concentric therewith; a plurality of cross chains adapted to pass between the spokes of the wheel and around the tire and having one end of each connected with said continuous member; a reversible harp link at the end of each cross chain; a common tightening member comprising a single length of chain adapted to pass freely through the larger ends of said harp links and to have its links engaged by the smaller ends thereof; and a toggle link for connecting the ends of said tightening member together.

In testimony whereof I have signed my name to this specification.

KENNETH LE GAR.